United States Patent [19]

Lucas et al.

[11] 3,969,476

[45] July 13, 1976

[54] SOLVENT-IN-PULP EXTRACTION

[75] Inventors: Bernard H. Lucas; Gordon M. Ritcey, both of Ottawa, Canada

[73] Assignee: Canadian Patents and Development Limited, Ottawa, Canada

[22] Filed: Feb. 19, 1974

[21] Appl. No.: 443,902

[30] Foreign Application Priority Data

Feb. 23, 1973 United Kingdom.................. 8978/73

[52] U.S. Cl......................................... 423/1; 423/9
[51] Int. Cl.$^2$......................................... C01G 43/00
[58] Field of Search ................ 423/24, 26, 9, 1, 54, 423/63, 70, 100; 75/101 BE

[56] References Cited
OTHER PUBLICATIONS

Ritcey, "Solvent–in–Pulp Processing Using Sieve Plate Pulse Columns," Chemistry and Industry, Nov. 6, 1971, pp. 1294–1299.

Kirk–Othmer, Encyclopedia of Chemical Technology, 2nd Edition, Interscience Pub., N.Y., 1966, vol. 9, pp. 380–391, vol. 10, pp. 604, 611.

Taggart, Elements of Ore Dressing, John Wiley & Sons, Inc. New York, 1951, pp. 277–281.

Yampol'skaya et al., Chemical Abstracts, vol. 66, 1967, No. 67976d.

Primary Examiner—Oscar R. Vertiz
Assistant Examiner—Brian E. Hearn
Attorney, Agent, or Firm—Alan A. Thomson

[57] ABSTRACT

In solvent-in-pulp extractions where aqueous leach slurries containing dissolved metal values and gangue particles of the silica, sericite or sulphide types are contacted with organic amine extractants, the loss of amine extractant to the solids is decreased sharply by pretreating the slurries with organic non-ionic hydrophilic material which is adsorbed by the gangue solids and decreases the affinity of the gangue solids for the amine. A combination of inexpensive materials has been found to be most effective. Crud formation is substantially avoided and the separation of phases is facilitated.

5 Claims, No Drawings

SOLVENT-IN-PULP EXTRACTION

In the normal process of recovery of metal values from ores, one usual method is to solubilize the values in an aqueous medium after reducing the ore to the proper particle size. The ore:solution ratio in the leaching step is raised over a range of values, usually governed by process variables such as temperature, filterability, etc. After solubilizing the metal values, the leach slurry is filtered and the metal recovered from the clarified solution by techniques such as precipitation, cementation, electrolysis, solvent extraction etc. Heap leach liquors, in situ leach liquors, bacterial leach liquors, and mine drainage waters containing a small amount of suspended solids are susceptible to similar treatment.

In the recovery of metal values from solution, by solvent extraction, many types of equipment have been designed and put in operation. Such devices are mixer-settlers; packed, spray, mixing and pulsed columns; centrifuges, etc. To decrease processing costs during recovery of the metal values, one plan would be to eliminate filtration of the leach slurry and thus extract and recover the values by solvent extraction directly from the pulp.

The problem then is to devise a suitable process whereby the leach slurry containing the values would be advantageously contacted with an aqueous-immiscible organic such that the metal values would be transferred to the organic phase.

Two of the operating costs in a solvent-in-pulp (SIP) circuit are the solvent losses and the handling of crud. The solvent losses on the solids and in the crud emulsion are, in some cases, as much as 10 and 1000 times respectively the soluble loss in the solution. In order for such a process to be feasible, minimal emulsions or crud formations could be permitted to form to any extent (or very economical solvent recovery schemes would be needed).

The conventional process for the recovery of metals from solution resulting from the leaching of ores, residues, etc. is to thicken, filter, clarify and to follow by the metal-recovery stage from the clear solution. Such techniques as ion exchange and solvent extraction have been used for metal recovery without serious operating problems on the clear solution.

Up to the present time, no process has been run on a plant-scale for the recovery of metals directly from ore leach slurries. Early work on mixer-settlers proved unsatisfactory because the excessive agitation caused stable emulsions and crud formation with amines. The use of alkylphosphates was physically more satisfactory, but the entrainment of solvent was great.

The prior processes of solution preparation for the recovery of metal values have several disadvantages. Many pieces of expensive filtration and clarifying equipment are required as well as high maintenance costs. Also, in the filtration step, soluble metal values are often lost due to occlusion or adsorption on the filtered ore particles.

PRESENT INVENTION

The main feature of this invention is the use in solvent-in-pulp extractions of a non-ionic hydrophilic organic material e.g. protein or carbohydrate hydrophilic colloids. These reagents are added to the leach slurry to minimize or prevent solvent adsorption losses on the ore and gangue particles in the subsequent extraction process. By preventing high losses of solvent to the particles, and elimination of possibilities for crud formation, extraction and recovery of metal directly from leach slurries is thus rendered feasible. By extracting directly from the leach slurry, the capital costs of expensive filters or other solids separation means are eliminated, as well as continual costly maintenance of the filtration or separation equipment, resulting in substantial cost savings.

The invention is a process for the solvent extraction of an aqueous leach slurry containing dissolved metal values, and gangue particles of the silica, sericite or sulphide types, with organic amine extractants, wherein the improvement comprises pretreating the leach slurry with a non-ionic hydrophilic organic material which is adsorbed onto the gangue solids, the pretreated gangue solids having decreased affinity for the amine extractant during the extraction.

In our invention, the leach slurry (e.g. containing up to about 55 w/o solids, and containing the solubilized metal values) is contacted directly with an aqueous insoluble organic amine reagent for the recovery of the metal by extraction into the organic medium. The organic phase may consist of a dilute solution of an active organic amine extractant dissolved in a diluent such as kerosene, toluene, benzene, etc. A wide variety of amines are known as extractants for many metals (see for instance F. L. Moore, "Liquid-liquid Extraction with High-molecular-weight Amines," Nuclear Science Series, NAS-N5 3101, NRC, Office of Technical Services, Dept. of Commerce, Washington D.C., Dec. 15, 1960, and G. M. Ritcey, "Solution Purification by Ion Exchange or Solvent Extraction," IC 237, Mines Branch, Dept. Energy, Mines and Resources, Ottawa, November 1971.)

This solvent-in-pulp extraction for the recovery of metal values is accomplished by using a sieve-plate pulse column, or other suitable contacting device, which provides adequate mixing for mass transfer without extreme agitation. Extreme agitation would be unsuitable, due to the formation of stable emulsion, cruds, etc. Extraction is carried out in an aqueous- or organic-continuous manner. In a column, for example, filled with the slurry, the fresh slurry would enter near the top of the column and the organic near the base of the column. Due to the difference in density, the organic medium would rise up the column extracting the metal values from the downflow of leach slurry containing the values. The metal-containing organic, or loaded solvent, overflows at the top of the column, while the slurry deficient in the metal now extracted, passes out the base of the column.

The successful operation of a solvent-in-pulp system for the recovery of metals from leach slurries will be dictated by the efficiency of extraction as well as by the amount of organic extractant lost to the slurry raffinate. Some of the factors that might be considered as affecting the degree of solvent losses in sieve plate pulse columns, are listed below, but not in any particular order of importance:

1. pulse conditions with regard to amplitude and frequency.
2. diameter of holes in sieve-plates.
3. solvent concentration.
4. total flow throughput rate.
5. per cent solids in slurry.
6. specific gravity of solids.

7. screen analysis of pulp.
8. ore minerology.

A wide variety of amines have been used in solvent extraction of metals. These amines may be primary, secondary, tertiary, or quaternary, depending on the metal values and system being extracted. Suitable amines are for example, trioctylamine, tri($C_8 - C_{13}$) amine, di(tridecyl)amine, methyl tri($C_8 - C_{10}$)ammonium chloride, and $C_{18} - C_{22}$ primary amines. Liquid hydrocarbon diluents are usually used with such amines to form the organic phase.

Many extractions where the amines are used, and where gangue is as described below, could become a solvent-in-pulp process. Sulphate, chloride, nitrate or thiosulphate leach media are known for extraction of the following metals inter alia (in no particular order):

TABLE I

| $SO_4$ | Cl | $NO_3$ | Thiosulphate |
|---|---|---|---|
| Y | Ag | U | Np | Pb |
| Rare Earths | Co | Y | Pa | Pd |
| Zr | Cr | Rare Earths | Pu | |
| Th | Cu | Mo | U | |
| U | Fe | W | Zr | |
| V | Hf | Sn | Y | |
| Mo | Zr | Pb | Rare Earths | |
| Fe | Nb | | Th | |
| Hf | Ta | | Mo | |
| Nb | Pa | | | |
| Ta | Po | | | |
| Tc | Pu | | | |
| Ti | Pt | | | |
| | Pd | | | |
| Cr | Ir | | | |
| Pa | Ru | | | |
| Ru | Rh | | | |
| | Zn | | | |

The following rock and mineral types found in typical gangues from the metal ores described, are a. Silica type: e.g. quartz, aventurine, chert, flint, sand, sandstone, quartzite, granite, orthoclase, microline, aplite, pegmatite;

b. Sericite: member of Mica Group, e.g. muscovite, phlogopite, biotite, lepidolite; and c. Sulphides: e.g. pyrite, pyrrotite, chalcopyrite, bornite, chalcocite, pentlandite, sphalerite, galena, argentite, realgar, stibnite.

Although metal extraction, (for example, uranium) presented no problem in the pulp system, the high loss of solvent that occurred necessitated further study to establish the cause of losses as well as methods to reduce the losses. We consider solvent losses to be due to: (a) solubility in the aqueous phase, which is well known to be low, approximately 10 – 20 ppm; (b) entrained solvent with the raffinate discharge; (c) solvent that is adsorbed on the slurry particles; and (d) solvent that is lost in an aqueous-solid-organic emulsion phase, commonly referred to as crud. The last two factors pertain to this invention.

In the previous solvent-in-pulp work done in mixer-settlers, Byrne studied the effect of the addition of surfactants to the feed to reduce solvent losses (D. A. Ellis, R. S. Long, and J. B. Byrne, Second U. N. Int. Conf. on the Peaceful Uses of Atomic Energy, Geneva 1958, 3, 499 – 501; and J. B. Byrne, USAEC Report DOW-146, 1956). Byrne found that hydrophilic surfactants (anionic) of the lignin sulfonate type reduced surface tension and reduced entrainment losses. However, this only reduced losses from 20 gal/ton feed to 9 gal/ton feed and water dilution was needed to reduce the loss to 1 gal/ton feed, the feed being U ore.

Considering uranium ore pulps and aliphatic amine + diluent extractants, the amine loss on the solids is of the order of ten times the soluble loss of amine in the aqueous raffinate, depending on the type of slurry and operating conditions. Further examination indicated that the solvent loss, whether by crud formation or by adsorption on particles, could be caused by specific minerals.

According to the present invention, tests were carried out on ground samples of quartz, pyrite and muscovite to determine the amine losses that would occur with the individual minerals. Minus 28 mesh quartz and muscovite were used, and minus 100 mesh pyrite. Amine losses for the individual minerals are shown in Table 2. It should be noted from these results that adsorption on muscovite was almost four times the amine adsorption on pyrite. Taking the screen analysis and surface area into account, pyrite was the worst offender.

TABLE 2

AMINE LOSSES ON INDIVIDUAL MINERALS

| Mineral | Screen Analysis +200 mesh % | Surface Area $m^2/g$ | Amine Loss lb/ton mineral |
|---|---|---|---|
| Muscovite | 52.5 | 4.16 | 14.8 |
| Pyrite | 35.0 | 0.24 | 3.7 |
| Quartz | 85.5 | 0.14 | 0.45 |

Tests were carried out using a uranium ore from Elliot Lake, Ontario. After solvent extraction using an amine + diluent organic phase, examination of the raffinate slurry, for adsorption losses due to screen size, showed increased loss with decreased particle size (or increased surface area). This relationship appeared to correlate with the pyrite and sericite concentration, i.e. increased loss with increased proportions of these particles.

Quite frequently during solvent extraction, factors such as slimes, preferential flotation of ore particles such as pyrite or graphite, excessive agitation, insufficient or no emulsion inhibitor, or the presence of chemicals added during the leaching, cause stable emulsions or cruds (emulsions-plus-solids). The cruds that are encountered can very frequently be broken down, either during the extraction if they are in small quantity, or by organic-wetted materials such as Teflon (trademark). Alternatively the crud can be allowed to rise in the column and to overflow with the loaded solvent, which is then filtered to recover the loaded solvent from the solids.

Since solvent losses in a solvent-in-pulp system appeared to be greatly dependent upon mineral type and size of grind, a series of tests were conducted to reduce solvent adsorption on the ore particles, and at the same time prevent emulsion or crud formation.

It was hypothesized that certain depressants and flocculation reagents might be beneficial. Natural and synthetic, ionic and non-ionic surfactants or reagents were selected for an initial screening to narrow the field. A summary of the better results will be found in Table 3.

TABLE 3

REAGENTS FOR DEPRESSING CRUD AND MINIMIZING SOLVENT LOSSES

| Reagent | Description | Type | Addition lbs/ton Dry Feed | % Amine Loss Reduction |
|---|---|---|---|---|
| Dispersonal* 4412 | Fatty acid amide emulsion | cationic | 0.5 | 35 |
| Antifoam 60 GE | Silicone emulsion | non-ionic | 0.2 | 51 |
| Alchem 2214* | Organic sequestering reagent (polyol ester) | " | 0.5 | 53 |
| Jaguar MDD* | Treated guar gum | " | 0.5 | 40 |
| Dextrose WW82 | Treated dextro-glucose | " | 0.5 | 34 |
| Sucrose | Table sugar | " | 0.5 | 56 |
| Gelatine | Protein | " | 0.5 | 31 |
| Swift* 192 glue | Protein, animal glue | " | 0.5 | 38 |
| Swift* 164 glue | Protein, animal glue | " | 0.5 | 36 |
| Lepage's* Liquid Glue | Protein, fish glue | " | 0.5 | 74 |

*Trademark

Other fish glues have been used effectively such as National Sea Products Ltd. Liquid Glue.

Further results related to the nature of the gangue particles are given in Table 3A.

TABLE 3 A

EFFECT OF SURFACTANTS ON MINERALS TO REDUCE AMINE LOSS

| Reagent | Wt. Added lbs/TDS | % Reduction of Amine Loss | | |
|---|---|---|---|---|
| | | Pyrite | Muscovite | Quartz |
| Sucrose | 5 | 26.3 | 31.1 | 98.7 |
| Alchem 2214 | 3 | 98.5 | 0.0 | 70.0 |
| Fish Glue | 2 | 20.1 | 20.6 | 65.0 |
| Dex WW82 | 3 | 0.0 | 31.1 | 47.0 |
| Jag MDD | 3 | 5.8 | 10.8 | 78.0 |

Protein and carbohydrate hydrophilic colloids of the non-ionic type including crude sugars, have given the best results.

These results indicated that as well as the various hydrophilic colloids of the non-ionic type, some other non-ionic organic materials reduced solvent losses. In a further test, to substantiate these results with fish glue, a 30 percent slurry was conditioned with 2 lb. fish glue/ton feed solids and contacted with 0.1 M Alamine 336 (trademark for amine)* in the 2-inch pulse column. A 95 percent reduction of amine loss was achieved, reducing a 1.18 lb. amine loss/ton feed solids to 0.06 lb./ton feed solids. No crud was formed. A series of runs were made testing various concentrations of fish glue. In this particular series the runs were organic continuous with a U ore pulp and amine + diluent extractant. The results are shown in Table 4.
(*General Mills tertiary amine).

TABLE 4

THE EFFECT OF FISH GLUE IN REDUCING AMINE LOSSES IN SIP

| Run | Wt. Glue (lb/TDS) | Amine Loss (lb/TDS) | Observations |
|---|---|---|---|
| S1 | 0 | 1.17 | considerable crud, quartz-little pyrite and sericite |
| S2 | 0.5 | 0.75 | little crud of above composition |
| S3 | 1.0 | 0.55 | no crud |
| S4 | 1.5 | 0.59 | " |
| S5 | 2.0 | 0.45 | " |

Therefore, in our invention, by treating the leach slurry with non-ionic hydrophilic organic materials, particularly the protein and carbohydrate class of hydrophilic colloids, solvent losses by adsorption on ore or gangue particles will be considerably reduced, and as well crud formation will be minimized or eliminated. A crude sugar or molasses could be used instead of the table sugar. A suitable concentration range of reagent is about 0.1 to about 2 lbs/ton feed. Assuming a 1 lb. glue/ton feed is sufficient, it would approximate a break-even point with solvent loss cost.

Such solids control operations as cycloning, flotation, slurry pre-treatment e.g. wash columning, or crud-handling, could be eliminated to constitute a saving. Indications from our work are that heavier pulp densities than 30% could be handled.

Using a pulse column without an additive, 35 – 40 cpm pulse frequency can be used to keep the crud and amine losses down. However, the extraction of uranium then becomes quite low at 65 – 70% in 18 feet of pulse column plates. In the S series of runs (Table 4) 60 cpm pulse frequency was used giving satisfactory uranium extraction in 18 feet of column plates. A number of pilot plant runs were done at 1 lb. of fish glue/ton dried solids to check the method of addition, heating and age of slurry used plus amine loss. Results on an aqueous continuous run using a 12-day-old slurry gave an amine loss of 0.16 lb./TDS and a uranium extraction of 95.6%. Eighteen feet of pulse column plates were used at a pulse frequency of 50 cpm. The A/O ratio was 7/1. Pulp density was 30% and feed pH 1.3.

Further work has been directed toward reagent cost reduction by use of low cost secondary additives. In comparable tests, 0.5 lb. of $Na_2SiO_3$ plus 0.5 lb. of fish glue reduced the amine loss by 70% as opposed to 0.5 lb. fish glue reducing the loss by 35% (see Table 5).

The sodium silicate used was Type "N" liquid silicate (Philadelphia Quartz Co.) with $SiO_2/Na_2O$ ratio of 3.22. However other alkali metal silicates have given satisfactory results, although they were somewhat less effective than this Type "N" specified.

TABLE 5

COMBINATION OF ADDITIVES

| First Conditioning | | Second Conditioning | | |
|---|---|---|---|---|
| Reagent | Wt. Added (lb/TDS) | Reagent | Wt. Added (lb/TDS) | % Reduction of Amine Loss |
| Alchem 2214 | 1 | Fish Glue | 1 | 16.2 |
| Fish Glue | 2 | Alchem 2214 | 3 | 59.6 |
| Fish Glue | 1* | Alchem 2214 | 1* | 34.4 |
| Sucrose | 0.5 | Fish Glue | 2 | 30.9 |
| $Na_2SiO_3$ | 0.5* | Fish Glue | 0.5* | 59.7 |
| $Na_2SiO_3$ | 0.5* | Alchem 2214 | 0.5* | 26.2 |
| Fish Glue | 0.5 | $Na_2SiO_3$ | 0.5 | 42.1 |

TABLE 5-continued

| COMBINATION OF ADDITIVES | | | | |
|---|---|---|---|---|
| First Conditioning | | Second Conditioning | | |
| Reagent | Wt. Added (lb/TDS) | Reagent | Wt. Added (lb/TDS) | % Reduction of Amine Loss |
| $Na_2SiO_3$ | 0.5 | Fish Glue | 0.5 | 69.8 |
| Fish Glue | 0.5 | | | −35 |
| $Na_2SiO_3$ | 1.0 | | | +1.9 |
| $Na_2SiO_3$ | 2.0 | | | +8.5 |
| $Na_2SiO_3$ | 1 | Fish Glue | 0.25 | 25.8 |
| $Na_2SiO_3$ | 2 | Fish Glue | 0.25 | 31.1 |

*One mix of both reagents.

These tests (Table 5) were carried out using the additives sequentially, except a mixture was used where indicated for both first and second conditioning steps.

Cost estimates for U ore extraction would indicate that SIP using 1 lb. fish glue would reduce costs over a conventional thickner-filter-IX* plant by 11¢/lb. U. and that 0.5 lb. $Na_2SiO_3$ plus 0.5 fish glue would save 19¢/lb. U. If the saving due to the elimination of uranium soluble losses (0.5%) are added, the figures would be 14¢ and 22¢ respectively. Recycle of dilution water in the SIP circuit indicates a further saving in neutralizing costs.

(*IX = ion exchange).

Any soluble alkali metal silicate can be used with sodium silicate usually most economical. Amounts up to about 2 lb./ton dry solids may be used with about 0.3 to 0.5 lb. preferred. Conditioning with the silicate first, then the glue second, has given best results.

Although the cost of solvent loss is of major concern, the pollution aspects could be serious enough to prohibit operations even if the solvent loss cost could be tolerated. Therefore the cost of preventing solvent adsorption losses to the solids, by the addition of biodegradable additives such as glues, or crude sugars may well be warranted on the basis of anti-pollution.

The contacting device, in the extraction of the desired metal, can be a sieve-plate pulse column, or any suitable type of contactor which provides sufficient stages of contact for good mass transfer of the metal from the aqueous slurry to the organic phase. If the mixing of the slurry with the extractant is gentle enough, any tendency for emulsion or crud formation will be decreased. The present invention allows an increase of intermixing (and increase in mass transfer) without the expected increase in crud formation and solvent losses.

We claim:

1. In a process for the solvent extraction of an aqueous leach slurry containing dissolved metal values, and gangue particles selected from the group consisting of the silica, sericite and sulphide types, with organic amine extractants, at least part of said metal values being extractable by said amine extractants, the improvement comprising pretreating the leach slurry with a fish glue material which is adsorbed onto the gangue solids, the pretreated gangue solids having decreased affinity for the amine extractant during the extraction.

2. The process of claim 1 wherein sodium silicate is also present during the pretreatment.

3. The process of claim 2 wherein treatment with sodium silicate precedes treatment with fish glue.

4. The process of claim 2 wherein the fish glue and sodium silicate are used in approximately equal proportions.

5. The process of claim 4 wherein about 0.3 – 0.5 lb./ton dry solids of each additive is used.

* * * * *